Patented Oct. 19, 1943

2,332,206

UNITED STATES PATENT OFFICE 2,332,206

ABRASIVE ARTICLE

Loring Coes, Jr., Brookfield, Mass., assignor to Norton Company, Worcester, Mass., a corporation of Massachusetts No Drawing. Application August 12, 1941, Serial No. 406,537

12 Claims. (Cl. 51—298)

This invention relates to abrasive articles, and more particularly to articles made of abrasive grains bonded by a synthetic resin.

Many compounds, such as methyl methacrylate, which contain an unsaturated group $CH_2=C-$ are capable of polymerization by a rearrangement of the primary valence bonds in such a way that a more saturated structure is produced which consists of a linear chain having the group $CH_2-C-$ as a repeating unit. This linear chain polymer ordinarily has the properties of fusibility and solubility, and the length of the chain (molecular weight) determines to some extent the hardness, toughness, brittleness and melting point as well as the solubility of the polymerized substance. If such a linear chain compound is polymerized with another compound containing two or more polymerizable unsaturated methylene groups in the same molecule, the growing chains incorporate the $CH_2$ groups of both substances and form an interpolymer having a three dimensional structure in which the linkages are established between the chains to an extent depending upon the amount of cross linking agent used.

Abrasive bodies may be made by bonding abrasive grains with the linear chain polymer; but for some purposes that type of bond does not present desired properties. I have discovered that the acrylic, chloracrylic and methacrylic acid esters of the hypothetical ethylidene glycol, $CH_3CH(OH)_2$, are particularly effective as cross linking agents for other polymerizable unsaturated methylene compounds of the linear chain type, such as methyl methacrylate, and that these copolymers are well adapted for use as abrasive bonds.

One object of my invention is to provide useful abrasive articles having desired characteristics differing materially from those of the standard products heretofore made.

Other objects are to provide an abrasive article in which the bond is made of a linear chain type of unsaturated methylene compound copolymerized with an ethylidene glycol ester of acrylic, chloracrylic or methacrylic acid and to form a series of abrasive articles of widely different characteristics which will serve many useful purposes. Further objects will be apparent in the following disclosure.

The cross linking agents may be made in accordance with the following general procedure, which specifically applies to ethylidene dimethacrylate. The formula of this compound may be written as follows:

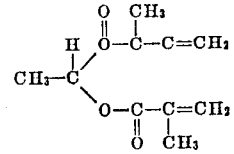

The monomeric material may be prepared by the addition of acetylene to methacrylic acid, using a suitable catalyst, such as mercuric sulfate or boron trifluoride. For example, I may proceed as follows: Five grams of mercuric oxide are dissolved in 100 c. c. of glacial acetic acid heated to a temperature of 85 to 90° C. with vigorous stirring. To this mixture is added 3.3 c. c. (1% excess) of concentrated sulfuric acid mixed with 5 c. c. of glacial acetic acid, and this mixture is added dropwise during stirring to the mercuric acetate solution. The mercuric sulfate is then allowed to settle and the greater part of the acetic acid is drawn off by suction. Most of the sulfuric acid is washed out of the catalyst by the addition of 100 c. c. of glacial acetic acid and drawing off all but about 25 c. c. To this catalyst, 100 c. c. of 100% methacrylic acid containing pyrogallol as a polymerization inhibitor is added, and the mixture heated to 85 to 90° C. Acetylene gas, after passing through sulfuric acid, is added to the mixture at the rate of about 8 liters per hour. The gases issuing from the reaction flask are passed through a trap cooled in ice water which collects a considerable quantity of vinyl methacrylate. At the end of six or eight hours, the catalyst is filtered off and the filtrate is combined with the liquid from the trap. The mixture is diluted with ether and the ether solution washed with aqueous sodium carbonate until neutral. After drying the ether solution with calcium chloride, it is distilled in order first to remove ether and vinyl acetate (which are volatile and are not condensed) and then to separate the products. The first product collected is vinyl methacrylate which boils at 48° C. at 60 mm. pressure. The ethylidene dimethacrylate which comes over next boils at 89 to 91° C. at 11 mm. Inasmuch as the ethylidene dimethacrylate is formed by the addition of another mol of acetylene to the vinyl methacrylate, conditions may be so controlled as to increase the yield of the ethylidene dimethacrylate.

Pure monomeric ethylidene dimethacrylate is a colorless liquid which boils at 75° C. at 3 mm. pressure and has a faint odor. It is insoluble in water and has a density greater than 1.0. It polymerizes to a hard, brittle solid having many cracks, but when used in suitable proportions to modify a base substance, such as methyl methacrylate, an interpolymer may be made which is not subject to severe strains or cracking.

In accordance with my invention, I propose to make abrasive articles, such as grinding wheels, sharpening stones, cutting-off wheels and honing, lapping and polishing devices, by bonding abrasive grains, such as crystalline alumina, silicon carbide, boron carbide, diamonds and other types of abrasive materials, with resin substances formed of interpolymers of certain linear chain base substances with the ethylidene glycol esters. The linear chain base substances are the alkyl esters of acrylic acid, chloracrylic acid and methacrylic acid with the lower aliphatic alcohols having not over 4 carbon atoms, i. e. the methyl, ethyl, propyl and butyl alcohols. These base substance esters or mixtures thereof may be copolymerized with the ethylidene glycol esters or mixtures thereof, with or without other modifying substances, in proportions required for making desired physical and abrading characteristics of the abrasive article. The ethylidene esters are capable of modifying the properties of the polymerized base substances and of producing interpolymers having an improved strength, hardness or heat resistance, or of modifying other characteristics, such as the softening point and the solubility or resistance to solvents.

These interpolymers are formed by mixing the base substance and the cross linking agent in any proportions in which the materials are fully miscible or are soluble in one another so that the interpolymers are homogenous one phase substances. The proportions used determine the properties of the product and these materials may be mixed within the limits of miscibility in proportions of from 0.5% or less of the ethylidene glycol esters up to about 30% thereof in order to obtain the widely varying properties required for the bonds of grinding wheels or other abrasive articles. Since the linear chain type of ester is used in the larger amount, the properties of the interpolymerized mass are dominated by the base substance used. Some of the properties of the polymerized methacrylic acid esters are exemplified in the following table:

Polymers of methacrylic acid esters

| | Methyl | Ethyl | n-Propyl | n-Butyl | Isobutyl |
|---|---|---|---|---|---|
| Hardness (Pfund), G at 25° C | 220 | 141 | 100 | 1 | 210 |
| Tensile strength, lbs./sq. in | 9,000 | 5,000 | 4,000 | 1,000 | 3,400 |
| Impact strength (Dynstat) | 10.5 | 7.1 | 6.5 | 11.5 | 1.6 |

It has also been found that comparatively hard resins are formed of the methacrylic acid esters of those alcohols which are branched as much as possible, i. e. the methyl, ethyl, isopropyl and tertiary butyl alcohol esters of methacrylic acid; while much softer resins are formed of the remaining esters, i. e. those of the normal propyl, normal primary butyl, normal secondary butyl and primary isobutyl alcohols. In general, the hardness, tensile strength and the thermal yield point decrease with the increase in molecular weight of the esterified alcohol. For example, methyl methacrylate softens above 100° C. while n-butyl methacrylate is soft and flexible at room temperature. Isopropyl methacrylate softens at 95° C. and is strong. Secondary butyl methacrylate softens at 62° C. and is brittle. However, the branching of the alcohol materially affects these various properties, as shown by the fact that isopropyl alcohol forms a methacrylate resin that is almost as hard as is polymerized methyl methacrylate. Also, the isobutyl ester is much harder and has a higher softening point and is less flexible than the straight chain butyl ester. Hence, these various esters have widely varying properties. Likewise, the copolymers of ethylidene glycol esters with the above mentioned esters of methacrylic acid, as well as those of acrylic and chloracrylic acids, have similarly variable characteristics. Therefore, by suitably selecting a given linear chain type ester as a base substance and modifying it with a selected ethylidene glycol ester, I may make abrasive bonds of many types as needed.

A small amount of the cross linking agent will materially change the properties of the bond, such as its solubility and softening point. The agent may be used in a large proportion so as to form a substantially infusible and insoluble body, or the amount may be so selected as to produce properties intermediate between those of the polymerized base substance and of the highly cross linked ethylidene ester. As little as 0.5% by volume of the acrylic, chloracrylic or methacrylic acid ester of ethylidene glycol will materially change the properties of a bond of methyl methacrylate or the other base substance and form an interpolymer of greatly reduced solubility and a higher softening point. The ethylidene glycol acrylate produces a softer resin of lower softening point than does the methacrylate. Yet, it has desirable characteristics. For example, a bond of methyl methacrylate alone, which begins to soften at about 100° C., will smear over the face of a grinding wheel when used in a dry grinding operation. An interpolymer of that ester with 15% of ethylidene acrylate softens at about 95° C. On the other hand, the interpolymer will not smear and thus is greatly superior in that characteristic. This results from the fact that an increase in the amount of the ethylidene ester decreases the ability of the material to flow under heat.

In the preparation of an abrasive article, the mixture of chosen monomeric polymerizable substances may be incorporated with the abrasive grains in desired proportions after which the bond is polymerized by heat with or without the aid of a catalyst, such as benzoyl peroxide. Suitable procedure may be adopted for making such bonded articles in accordance with the methods set forth in the patent to Kistler and Barnes Patent No. 2,218,795 of Oct. 22, 1940, or as set forth in the Kistler and Barnes Patent No. 2,256,618 granted on September 23, 1941, on an application Serial No. 228,004 filed Sept. 1, 1938.

As a specific example covering the manufacture of an abrasive article, I may incorporate a desired amount of abrasive grains with a mixture of 90% of monomeric methyl methacrylate and 10% of monomeric ethylidene glycol dimethacrylate. This mixture is polymerized in the presence of the abrasive grains in a suitable mold, with or without the aid of a catalyst, such as benzoyl peroxide, and under sutable temperature conditions, such as 60° C. for 24 hours. After removal from the mold, this polymerized body may then be subjected to a further heat treatment, such as 130° C. for 8 to 12 hours which serves to harden the resin further and improve its bonding characteristics.

A porous abrasive article of controlled structure having required abrasive bond and pore volumes may be made by forming a plastic mass of the bond substance and pressing a mixture of abrasive grains and the bond in suitable proportions to the desired shape and volume structure, after which the polymerization of the bond is completed to form a hard and integral body. For example, methyl methacrylate or other linear chain type of ester and one of the ethylidene glycol esters may be mixed in desired proportions, such as 90 parts of the former to 10 parts of the latter and this monomeric mass, together with 0.02% of benzoyl peroxide, or other catalyzer, may be heated to 80° C. for about 1 hour to partially polymerize the monomeric mixture and form a viscous liquid. This viscous mass is then mixed with abrasive grains and an article shaped therefrom as desired. A suitable bond for a grinding wheel may comprise 272 grams of methyl methacrylate and 100 parts of the ethylidene glycol ester. The proportions of the grains and bond depend upon the structure characteristics desired. The ingredients may be mixed together in a mixing kettle, such as one having rotating paddles, so as to stir the mass thoroughly and to cause the bonding fluid to wet or coat the grains and form an intimate contact therewith and to cause the grain to become substantially uniformly dispersed throughout the resinous bond. After the mixing operation has been completed, the mass may be shaped in a suitable mold and preferably with pressure required to give the desired structure. The shaped mass is thereafter heated, either in or outside of the mold, to complete the polymerization of the bond. This heating step may comprise heating the molded mass in an oven at 60° C. with or without the aid of light for 24 hours to substantially complete the polymerization of the monomeric substance present; after which it may be given a further final baking treatment at 100° C. for a period of 5 hours or so. The temperature-time conditions widely varied.

It will be appreciated that the porosity of the article as thus made will depend upon the relative proportions of the abrasive grains and the bond. If the bond is present in amount insufficient to fill the pore spaces, then the bond coated grains will lie substantially in contact, with the pore spaces therebetween determined by the size and the shapes of the abrasive grains. One may use the bonded grains in such proportions as to form a mass having large air spaces therein and which may be compressed to a smaller volume in accordance with the method set forth in the Howe and Martin Patent No. 1,983,082 and the volume structure of the article will be thereby fully determined. The percentage by weight of the bond in a grinding wheel may vary from 4 or 5% for a very soft wheel to 30% or more for a harder wheel, and for certain special wheels there may be as much as 50% of bond.

As a further method for making an article of required porosity or structure, one may employ a fully polymerized resin formed of the various ingredients herein set forth. For example, the mixture of monomeric substances may be copolymerized as a fine molding powder by adding the monomeric substances in required amount, together with a small amount of benzoyl peroxide, to a quantity of carbon tetrachloride or other solvent with which the liquid monomer is completely miscible and in which the polymer is not soluble. This mass may then be placed on a constant temperature bath maintained at 65° C. for about 5 hours. This causes the copolymer to precipitate as a fine powder, which may be filtered off and dried and stored for subsequent use. This dry molding powder may be softened or plasticized by means of a suitable agent which is capable of dissolving or otherwise plasticizing the bond and causing it to adhere firmly to the abrasive grains. The copolymer containing methyl methacrylate or other alkyl ester of said acids may be softened on the exposed surfaces of the resin particles by means of a solvent for the polymer, such as acrylic or methacrylic acid. This may be accomplished by mixing the liquid monomeric substance with the dry polymerized resin in a suitable mixing machine; or one may first wet or coat the abrasive grains with 5 or 10%, more or less, of the liquid monomer and thereafter mix in the dry polymeric powder and thus cause it to adhere to the grains as a coating thereon. The proportions of the two ingredients may be widely varied, since any excess of the monomeric liquid is ultimately converted to a hard substance by polymerization. It is desirable to use enough liquid solvent to insure that all of the resin particles are fully coated therewith and to insure that the polymerized powder adheres intimately to the abrasive. A slight amount of a catalyst, such as 0.02% of benzoyl peroxide, in the liquid monomeric substance will insure its complete polymerization. Many types of polymerizable substances may be used as plasticizers for the dry molding powder, such as monomeric vinyl acetate or styrene, and these will be thereafter heat hardened by a polymerization process and aid in uniting the materials as an integral body. The plastic mass may be shaped in a mold and preferably under the pressure of several tons in a hydraulic press. Thereafter, the bond is subjected to heat, either within or outside of the mold, to complete any polymerization that is required. The final heating step may be at 160° C. or other suitable temperature. This heat and high pressure may cause the polymerized hard resin to soften and to adhere to the abrasive grains. Upon cooling, the mass solidifies and forms an integral structure. If the polymerized bond is so proportioned and constituted as to form a thermoplastic substance, it may be molded with abrasive grains under a high pressure of 1500 to 6000 pounds per square inch at 175° to 200° C. without the use of a plasticizing solvent.

It is to be understood that any other suitable substance, either polymerizable or not, may be incorporated with the bond without departing from the spirit and the scope of this invention, and that the claims are to be interpreted accordingly as not excluding the presence of such other substances. The above disclosure is, therefore, to be considered as illustrating the principles of my invention and preferred embodiments and compositions thereof and not as imposing limitations on the claims as appended hereto.

This application is a continuation in part of my prior application Serial No. 239,533 filed Nov. 8, 1938; and certain features of the subject matter herein disclosed are claimed in my copending applications Serial Nos. 292,501, 292,502 and 292,503 filed on Aug. 29, 1939.

I claim:

1. An abrasive article comprising abrasive grains united by a bond composed primarily of a resin formed of copolymerized substances comprising an ester of an alkyl alcohol having not over four carbon atoms and an acid selected from the group consisting of acrylic, chloracrylic and methacrylic acids copolymerized with an ester of the hypothetical ethylidene glycol and one of said acids.

2. An abrasive article comprising abrasive grains united by a bond composed primarily of a resin formed of copolymerized substances comprising an ester of an alkyl alcohol having not over four carbon atoms and an acid selected from the group consisting of acrylic, chloracrylic and methacrylic acids copolymerized with a compatible and miscible amount of an ester of the hypothetical ethylidene glycol and one of said acids, said alkyl ester constituting the major portion of the mass and the bond being a substantially homogenous one phase substance.

3. An abrasive article comprising abrasive grains united by a bond composed primarily of a resin formed of copolymerized substances comprising an ester of an alkyl alcohol having not over four carbon atoms and an acid selected from the group consisting of acrylic, chloracrylic and methacrylic acids copolymerized in the presence of the abrasive grains with from 0.5 to 30% of an ester of the hypothetical ethylidene glycol and methacrylic acid.

4. An abrasive article comprising abrasive grains bonded as a porous integral body by a lesser amount of a bond composed primarily of a resin formed of copolymerized substances comprising an ester of an alkyl alcohol having not over four carbon atoms and an acid selected from the group consisting of acrylic, chloracrylic and methacrylic acids copolymerized a lesser, compatible and miscible amount of an ester of the hypothetical ethylidene glycol and one of said acids.

5. An abrasive article comprising abrasive grains bonded primarily by a resin formed of copolymerized substances comprising an ester of an acid selected from the group consisting of the acrylic, chloracrylic and methacrylic acids and an alkyl alcohol having not over four carbon atoms and branched as much as possible which is interpolymerized with a lesser compatible and miscible amount of an ester of the hypothetical ethylidene glycol and one of said acids.

6. An abrasive article comprising abrasive grains bonded primarily by a resin formed of copolymerized substances comprising an ester of an acid selected from the group consisting of the acrylic, chloracrylic and methacrylic acids and an alkyl alcohol of minimum branching having not over 4 carbon atoms which is interpolymerized with a lesser compatible and miscible amount of an ester of the hypothetical ethylidene glycol and one of said acids.

7. An abrasive article comprising abrasive grains bonded primarily by a resin formed of methyl methacrylate copolymerized with an ester of the hypothetical ethylidene glycol and an acid selected from the group consisting of the acrylic, chloracrylic and methacrylic acids.

8. An abrasive article comprising abrasive grains bonded primarily by a resin formed of methyl methacrylate copolymerized with from 0.5 to 30% by weight of ethylidene dimethacrylate.

9. An abrasive article comprising abrasive grains bonded primarily by a resin formed of methyl methacrylate copolymerized with from 0.5 to 30% by weight of ethylidene acrylate.

10. An abrasive article composed primarily of abrasive grains bonded by a resin formed of polymerized substances containing ethylidene dimethacrylate copolymerized with methyl methacrylate.

11. An abrasive article composed of abrasive grains bonded by a polymerized substance comprising an ester of a saturated aliphatic alcohol having not over four carbon atoms and an acid selected from the group consisting of acrylic chloracrylic and methacrylic acids, copolymerized with ethylidene dimethacrylate.

12. An abrasive article composed of abrasive grains bonded by a polymerized substance comprising an ester of an alkyl alcohol having not over four carbon atoms and an acid selected from the group consisting of acrylic, chloracrylic and methacrylic acids copolymerized with ethylidene acrylate.

LORING COES, Jr.